United States Patent Office 3,012,329
Patented Dec. 12, 1961

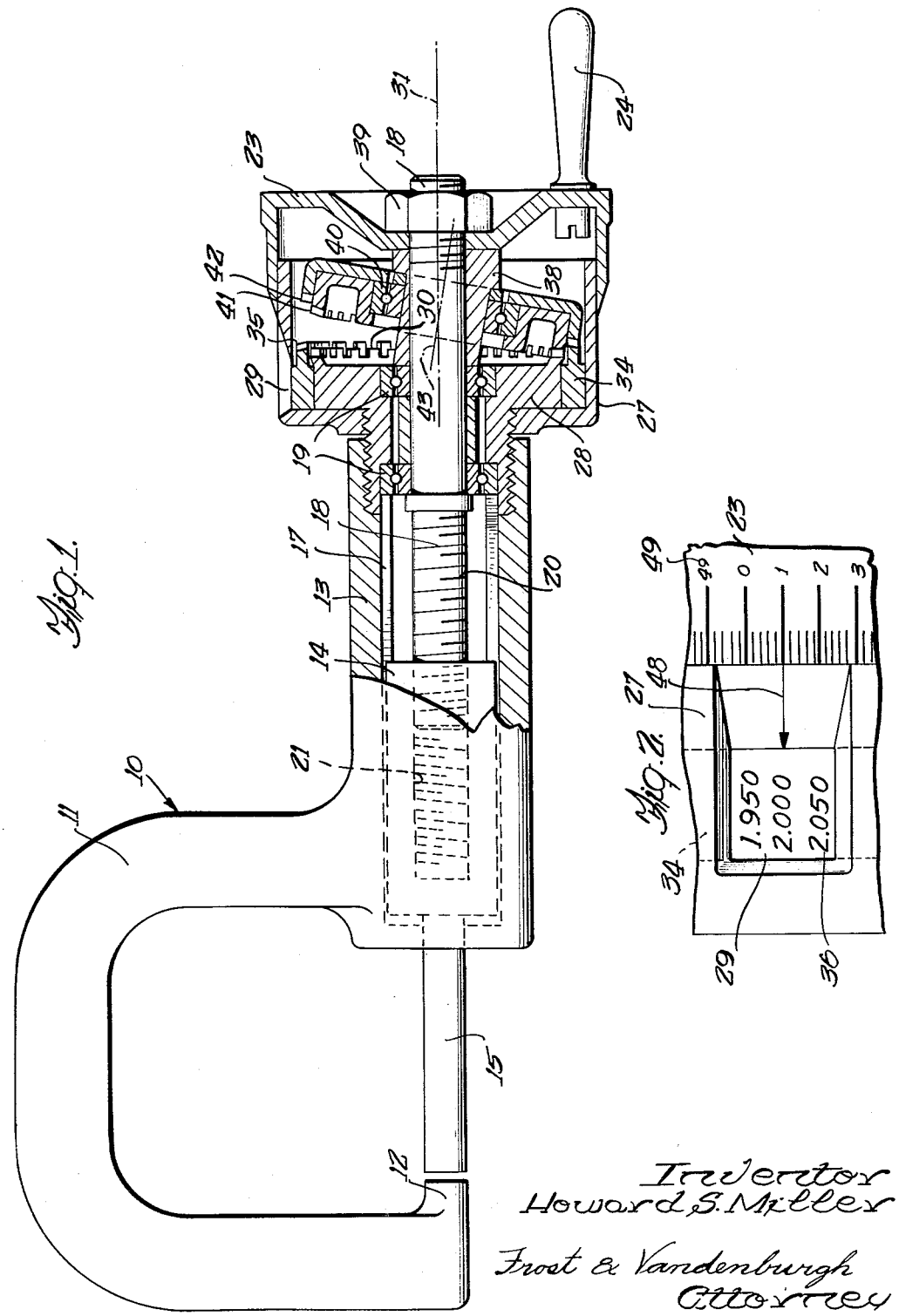

3,012,329
DIRECT READING MICROMETER HEAD
Howard S. Miller, S. Julian St., Naperville, Ill.
Filed Apr. 24, 1959, Ser. No. 808,593
2 Claims. (Cl. 33—166)

The present invention relates to a direct reading device for measuring the number of turns, and fractions of turns, of a rotatable shaft such as might be employed in a direct reading micrometer or the like.

In various forms of instrumentation it is necessary to know the number of turns and fractions of turns that one rotatable member has made with respect to a fixed member. Instruments requiring such a device include microscope stages, comparators or optical or astronomical measuring instruments. The embodiment described hereinafter is one employed in a micrometer but it will be readily apparent to those skilled in the art that the principles of my invention are applicable to other instruments.

In the past various structures have been devised for giving a direct reading of the number of turns and fractions of turns that a rotatable member makes with respect to a fixed member. Perhaps the most common type is that having a number of indicia wheels, each having a different rate of rotation. For example, there is a unit wheel, a tens wheel, a hundreds wheel, etc., with ten rotations of the unit wheel resulting in one rotation of the tens wheel, etc. Such devices are complicated and expensive to manufacture. As compared to these, the direct reading device I have devised is relatively simple and inexpensive to produce.

Another disadvantage of such "odometer" type devices is that they result in a substantial loading of the shaft whose revolutions are being measured. This is of no particular disadvantage in a device such as a speedometer where the power supply is more than ample, but in precision measuring instruments it becomes a serious handicap. The loading or the necessity for supplying substantial power to operate the train of gears and wheels not only makes it awkward to use but can actually result in inaccuracies and errors in the readings obtained. While the device I have devised does employ a simple gearing arrangement to provide the desired correct reading, it is one which involves no substantial loading of the shaft whose rotation is being measured. Thus, the principal object of my invention is to provide a direct reading micrometer or the like which overcomes the disadvantages of such prior art devices.

Other objects and advantages of my invention include the compactness of the structure employed to obtain the direct readings; ease of operation; the accuracy with which fractions of revolutions may be determined; readings may be made after rotating the shaft in either direction as there is no necessity for resetting the device from a zero or starting point; and the simplicity of reading which permits substantially no opportunity for error on the part of the user in the making of measurements.

Further objects and advantages will be apparent from the following description taken in conjunction with drawings in which:

FIGURE 1 is an elevational section through an embodiment of my invention; and

FIGURE 2 is a view of the direct reading scales of the embodiment of FIGURE 1.

In the embodiment of FIGURE 1 there is a frame generally 10 having a U-shaped portion 11 with an anvil 12 on one end of the U portion. The other end of the U portion has a barrel 13 within which a plunger 14 is slideably received. Plunger 14 has a measuring arm 15. Plunger 14 engages ways 17 to hold the plunger against rotation while at the same time permitting it to be moved longitudinally within barrel 13.

A shaft or spindle 18 is rotatably mounted in frame 10 by bearings 19. Shaft 18 is threaded as seen at 20 and engages a corresponding set of threads in opening 21 in plunger 14. Attached to the other end of shaft 18 is a thimble 23 which may be rotated by a handle 24. It will be apparent that as shaft 18 is rotated plunger 14 will be moved forward and back, depending upon the direction of rotation, by means of the threaded engagement between the shaft and the plunger. The plunger 14 in turn moves arm 15 to vary the space between the end of arm 15 and anvil 12. The purpose is to measure this space and the space is measured by the number of turns and portions of turns of shaft 18. The present invention is related to a direct reading device for measuring the number of turns of a shaft such as shaft 18 with respect to frame 10.

Forming an extension of barrel 13 are a pair of fixed members 27 and 28. Member 27 is cup-shaped and forms a housing for the gear structure hereinafter described. Member 27 has a window 29. Member 28 is also a part of frame 10 and has a crown gear 30 about the inner face thereof. Gear 30 is concentric with the axis of rotation of shaft 18, i.e. axis 31. About the periphery of member 28 is an annulus 34 having a crown gear 35 on the face thereof. Annulus 34 is journaled on member 28 for rotation about axis 31 with respect to member 28. As seen in FIGURE 2 member 34 has suitable indicia 36 about the periphery thereof which indicia appears through window 29.

On shaft 18 is an eccentric bearing support 38 which is clamped in place by nut 39. If desired, support 38 may be press fitted or otherwise secured to shaft 18. Mounted on support 38 is a bearing 40 which carries a pair of crown gears 41 and 42, respectively. Gears 41 and 42 are connected and are rotatably mounted about an axis 43 by means of support 38 and bearing 40. As will be seen, gear 42 meshes with gear 35 and gear 41 meshes with gear 30.

The number of teeth on gears 30 and 41 are the same. For example, in the disclosed embodiment each has a total of 54 teeth. The teeth of gear 41 have essentially zero eccentricity with respect to shaft 31. Gears 35 and 42 have a different number of teeth with respect to the other. Gears 35 and 42 are brought into mesh by having the axis of rotation 43 as seen in a plane through the midpoint of the teeth eccentric with respect to axis 31. Thus, in the disclosed embodiment gear 42 has 59 teeth while gear 35 has 60 teeth. Since the teeth on both gears 35 and 42 are of the same size the radius of gear 42 will be 59/60 of the radius of gear 35. This difference in size is overcome by the offset of axis 43 with respect to axis 31. The teeth of all of the gears 30, 35, 41 and 42 are milled similarly to bevel gears, but each gear looks practically as a crown gear.

As seen in FIGURE 2 the graduations 36 on annulus 34 appear through window 29. A zero or reading line 48 on fixed member 27 is used to indicate where the readings are taken. Suitable indicia 49 on thimble 23 is used to indicate the fraction of turns of rotation.

As shaft 18 is rotated through one revolution gears 41 and 42 will orbit about axis 31 of gears 30 and 35 as a result of the movement of eccentric bearing support 38. Gears 30 and 41 have the same number of teeth with gear 30 being fixed. Thus, gear 30 will cause gear 41 to walk about gear 30 during the orbital movement of gear 41. However, during one revolution of shaft 18 gear 42 will engage only 59 teeth of the 60 teeth of gear 35. Therefore, gear 35 and the annulus 34 of which it is a part will move one-sixtieth of a revolution with respect to gear 30 and frame 10. The fact that shaft 18 has turned one revolution will be shown by the indicia 36 appearing through window 29. Thus each significant figure of the series of indicia 36 can represent one-sixtieth of a revolution of annulus 34 with respect to frame 10. If only a fraction of revolution of shaft 18 is made that fraction will be read on indicia 49 of thimble 23.

As is customary practice, indicia 36 and 49 will be calibrated not in revolutions of shaft 18 but represent the particular measurement that is being made. For example, in the disclosed embodiment the indicia are calibrated to read directly the distance between the end of arm 15 and anvil 12. In this case threads 20 are of such a pitch that one revolution of shaft 18 will change the distance between the ends of anvil 12 and arm 15 by fifty-thousandths of an inch. Thus, each one-sixtieth of a revolution of annulus 34 represents fifty-thousandths and the significant figures of indicia 36 are set forth in fifty-thousandths increments. Similarly, since each revolution of thimble 23 corresponds to fifty-thousandths of an inch between the anvil 12 and arm 15, the indicia 49 are divided into a total of 50 major units with each major unit having five sub-divisions. Thus, each major unit represents a thousandth of an inch and each sub-division represents two ten-thousandths of an inch. The reading shown by pointer 48 in FIGURE 2 would be 2.0010 inches. The calibration for any specific device will be apparent to one skilled in the art from the foregoing description.

It will be noted that an important feature of my invention is the angular disposition of the axis of rotation 43 of the gears 41 and 42 with respect to the rotation of axis 31 of the shaft on which these gears are mounted and which also represents the axis of gears 30 and 35. This not only gives the compactness that is a highly desirable feature of my invention but it also enables the teeth of the respective pairs of gears 30—41 and 35—42 to be identical in size. If the teeth of one gear of the pair is not identical with the teeth of the other gear of the pair, undesirable operation will result. The teeth of one gear will bind or be excessively loose with respect to the teeth of its mating gear when they are not both the same size. Either situation is most undesirable. Binding will result in difficulty of operation while looseness will result in inaccuracies in the readings. By avoiding either situation by the construction I have devised, a sensitive, easily operable, mechanism is obtained.

The foregoing description is for the purpose of complying with 35 USC 112 and should not be construced as imposing unnecessary limitations upon the appended claims, inasmuch as variations thereof will be apparent to one skilled in the art. For example, the difference in the number of teeth between gears 42 and 35 could be greater than one tooth; gears 30 and 41 could be of an unequal number of teeth with gears 42 and 35 being an equal number; or both pairs of gears, 30—41 and 42—35 could be of unequal numbers of teeth.

I claim:
1. A micrometer or the like including a frame member; a screw rotatably mounted on said frame for rotation about an axis; a thimble attached to said screw; said thimble having indicia thereon; a first crown gear attached to said support member concentric with said axis; a second crown gear journaled on said support member for rotation about said axis, said second gear being of greater diameter than said first gear; means having indicia thereon connected to said second gear for movement therewith; a third crown gear; a fourth crown gear; said third and fourth gears being attached to each other; reading line means on said frame in juxtaposition to said indicia; and an eccentric bearing attached to said shaft; said third and fourth gears being journaled on said bearing for rotation about a second axis angularly positioned with respect to said first axis; said third gear being in engagement with said first gear with said first and third gears having an equal number of teeth; said fourth gear being in engagement with said second gear with said fourth gear having a different number of teeth than does said second gear; said fourth gear being positioned so that its axis of rotation as viewed in a plane through the teeth thereof is offset from said first axis.

2. A measuring instrument or the like including a support member; a screw rotatably mounted on said member for rotation about an axis; a thimble attached to said screw, said thimble having indicia thereon; a first gear attached to said support member concentric with said axis; a second gear journaled on said support member for rotation about said axis; means having indicia thereon connected to said second gear for movement therewith; a third orbital gear; a fourth orbital gear; said third and fourth gears being journaled for rotation about a second axis angularly disposed to said first axis; said third and fourth gears engaging said first and second gears respectively; said first and third gears forming a pair of gears and having teeth of corresponding dimensions; said second and fourth gears forming a pair of gears and having teeth of corresponding dimensions; one gear of one of said pairs of gears having a different number of teeth than the other gear of said one pair of gears; said orbital gear of said one pair of gears being positioned so that the axis of rotation of the orbital gear as viewed in a plane through the gear teeth is offset from said first axis; and reading line means on said frame in juxtaposition to said indicia.

References Cited in the file of this patent
UNITED STATES PATENTS

| 9,914 | Dibben et al. | Aug. 9, 1853 |
| 1,210,051 | Davenport | Dec. 26, 1916 |
| 2,144,110 | Herrick | Jan. 17, 1939 |